United States Patent [19]

Dwyer

[11] Patent Number: 5,153,627
[45] Date of Patent: Oct. 6, 1992

[54] FILM CASSETTE WITH SPOOL LOCK

[75] Inventor: Patricia A. Dwyer, Rochester, N.Y.

[73] Assignee: Eastman Kodak Company, Rochester, N.Y.

[21] Appl. No.: 656,279

[22] Filed: Feb. 15, 1991

[51] Int. Cl.$^5$ ............................................. G03B 17/36
[52] U.S. Cl. .................................. 354/217; 354/275; 242/71.1; 242/194
[58] Field of Search ............... 354/275, 217; 242/71.1, 242/71.2, 71.8, 194, 197

[56] References Cited

U.S. PATENT DOCUMENTS

| 3,831,881 | 8/1974 | Trucker | 242/194 |
| 4,294,466 | 11/1981 | Harvey | 354/214 |
| 4,311,377 | 1/1982 | Matteson | 354/217 |
| 4,324,469 | 4/1982 | Harvey | 354/173 |
| 4,987,437 | 1/1991 | Pagano et al. | 354/275 |

Primary Examiner—L. T. Hix
Assistant Examiner—D. Rutledge
Attorney, Agent, or Firm—Roger A. Fields

[57] ABSTRACT

A film cassette comprises a film spool supported within a lighttight shell for rotation in an unwinding direction to thrust a filmstrip coiled about the spool to the exterior of the shell and for rotation in a winding direction to return the filmstrip to the interior of the shell. According to the invention, a locking device is connected to the spool and the shell for preventing rotation of the spool in the unwinding direction, and is enabled for such purpose in response to rotation of the spool in the winding direction. This prevents a photographer from reusing the cassette in a camera after the filmstrip is fully exposed. The locking device can be manually defeated to reuse the cassette in the camera when the filmstrip is only partly exposed.

8 Claims, 13 Drawing Sheets

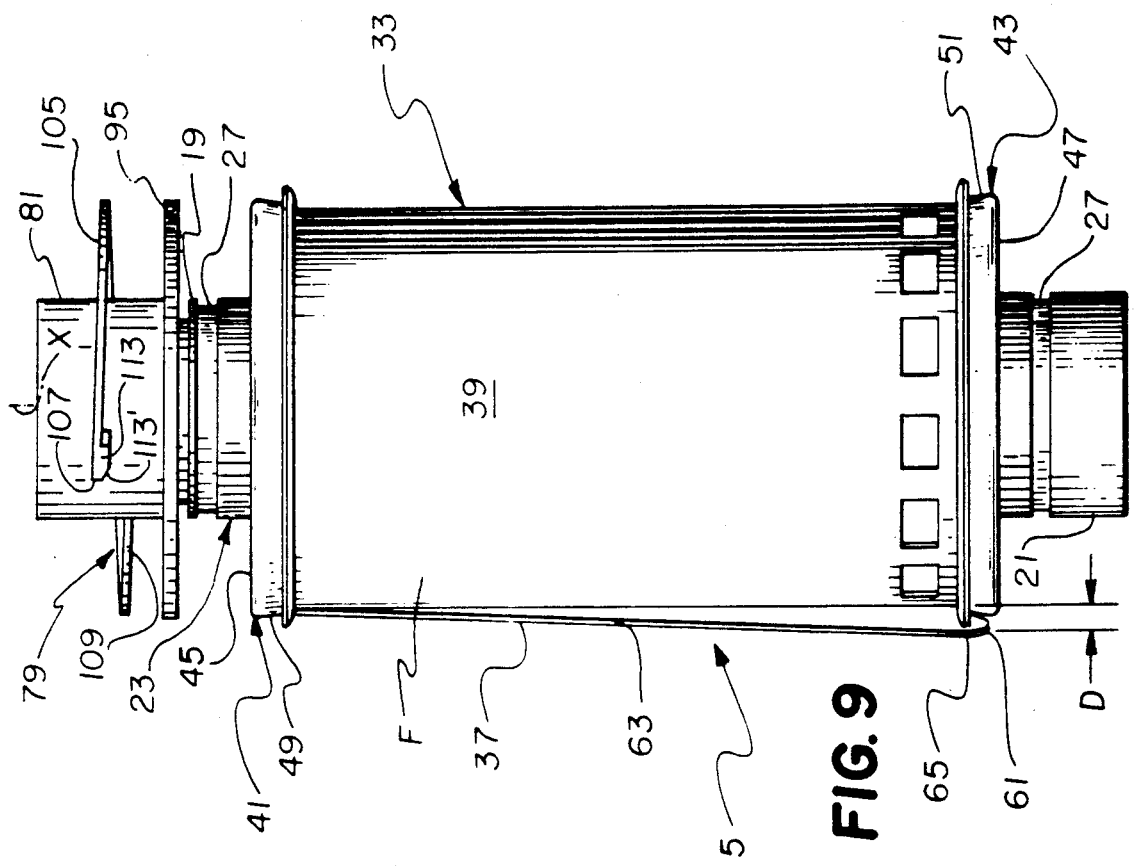
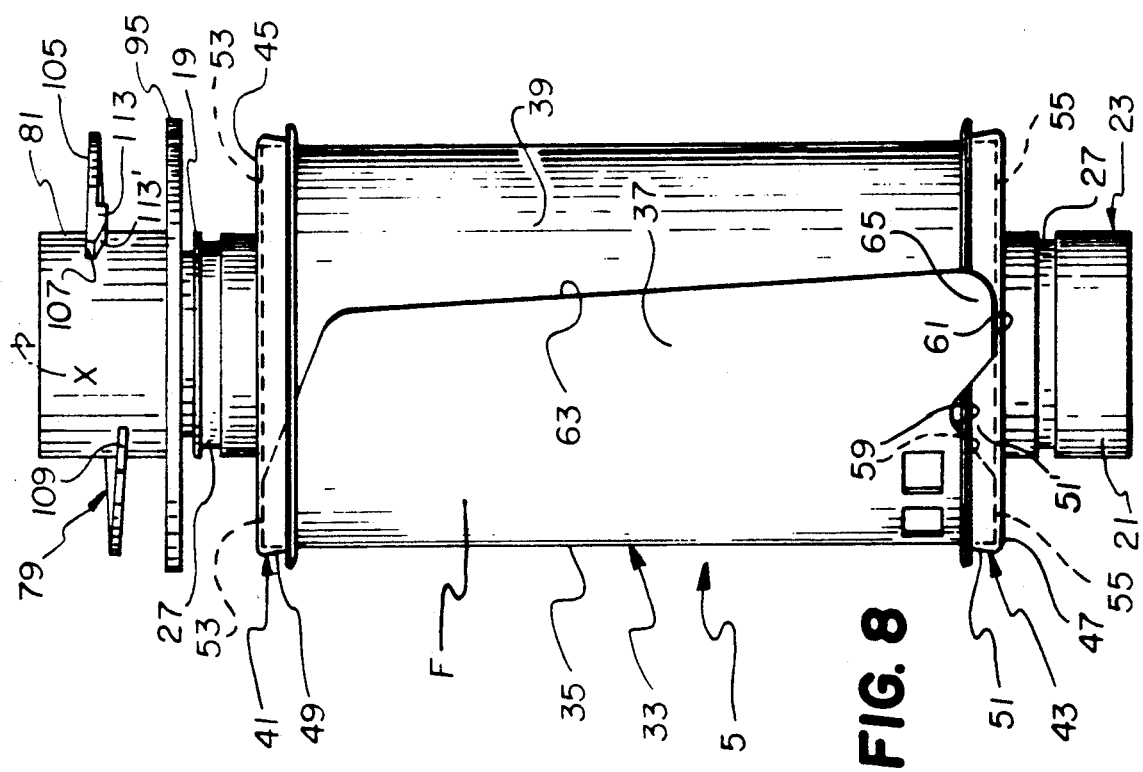

FILM CASSETTE WITH SPOOL LOCK

CROSS REFERENCE TO RELATED APPLICATION

Reference is made to commonly assigned copending application Ser. No. 07/520,309 now Pat. No. 4,987,437 entitled FILM CASSETTE WITH FILM EXPOSURE STATUS INDICATOR, and filed Aug. 13, 1990 in the names of Stephen H. Miller and Daniel M. Pagano.

BACKGROUND OF THE INVENTION

1. Field of the Invention

The invention relates generally to the field of photography, and in particular to a film cassette containing roll film. More specifically, the invention relates to a film cassette that is capable of automatically advancing a non-protruding film leader to the exterior of the cassette shell responsive to unwinding rotation of a film spool within the shell.

2. Description of the Prior Art

In conventional 35 mm film manufacturers cassettes, such as manufactured by Eastman Kodak Co. and Fuji Photo Film Co. Ltd., the filmstrip is wound on a flanged spool which is rotatably supported within a cylindrical shell. A leading or forward-most portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader is normally non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall. During initial unwinding rotation of the film spool, the leading end of the filmstrip is advanced to and through a non-lighttight film passageway in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced out of the cassette shell. In the patent, it is suggested that one manually rotate the film spool relative to the cassette shell until the film leader can be manually grasped and attached to a film advancing device in the camera. Thus, the camera is not used to rotate the film spool to advance the film leader from the cassette shell.

More recently, in U.S. Pat. No. 4,834,306, granted May 30, 1989, U.S. Pat. No. 4,846,418, granted Jul. 11, 1989, U.S. Pat. No. 4,848,693, granted Jul. 18, 1989, U.S. Pat. No. 4,875,638, granted Oct. 24, 1989, U.S. Pat. No. 4,887,110, granted Dec. 12, 1989, and U.S. Pat. No. 4,894,673, granted Jan. 16, 1990, there are disclosed other film cassettes wherein a non-protruding leader is advanced automatically out of the cassette shell responsive to rotation of the film spool in an unwinding direction. In those patents, as compared to U.S. Pat. No. 4,423,943, however, there is no suggestion to manually rotate the film spool to expel the film leader. The film spool is rotated by a suitable drive mechanism in a camera.

THE CROSS-REFERENCED APPLICATION

Cross-referenced application Ser. No. 07/520,309, U.S. Pat. No. 4,987,437 discloses a film cassette which comprises a film spool rotatable inside a lighttight cassette shell in an unwinding direction to thrust a filmstrip coiled about the spool automatically to the exterior of the shell, and a film exposure status indicator movable from an unexposed position for providing a visible indication that the filmstrip is unexposed to an exposed position for providing a visible indication that the filmstrip is exposed. The spool, the shell, and the status indicator include respective cooperating means for preventing rotation of the spool in the unwinding direction when the status indicator is located in its unexposed position, but which can be rendered ineffective by a suitable device in a camera, for example, to allow rotation of the spool in the same direction.

SUMMARY OF THE INVENTION

A film cassette comprises a film spool supported within a lighttight shell for rotation in an unwinding direction to thrust a filmstrip coiled about the spool to the exterior of the shell and for rotation in a winding direction to return the filmstrip to the interior of the shell. According to the invention, a locking device is connected to the spool and the shell for preventing rotation of the spool in the unwinding direction, and is enabled for such purpose in response to rotation of the spool in the winding direction. This prevents a photographer from reusing the cassette in a camera after the filmstrip is fully exposed. The locking device can be manually defeated to reuse the cassette in the camera when the filmstrip is only partly exposed.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
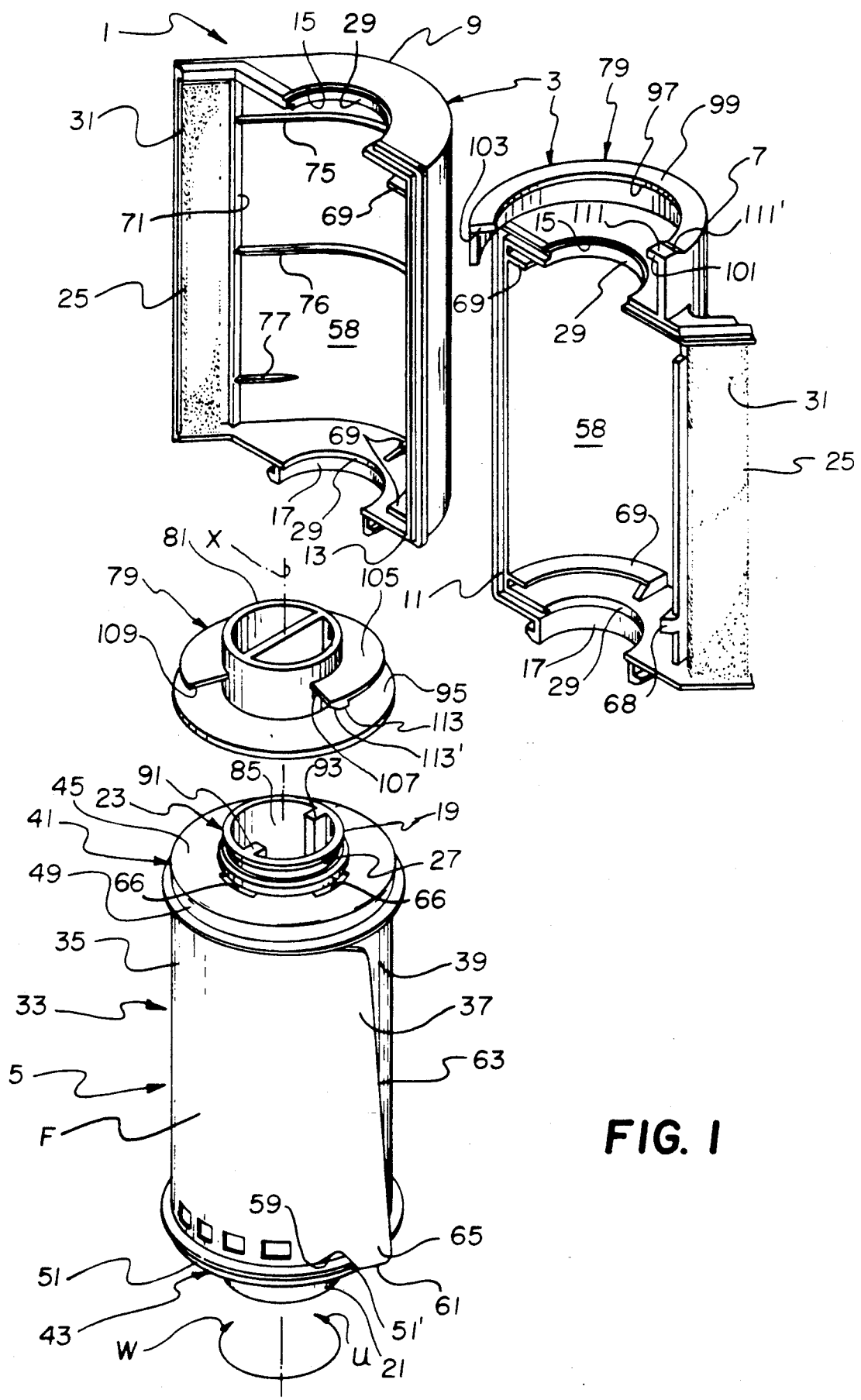
FIG. 1 is an exploded perspective view of a film cassette including a spool lock, according to a preferred embodiment of the invention.
Figure 2:
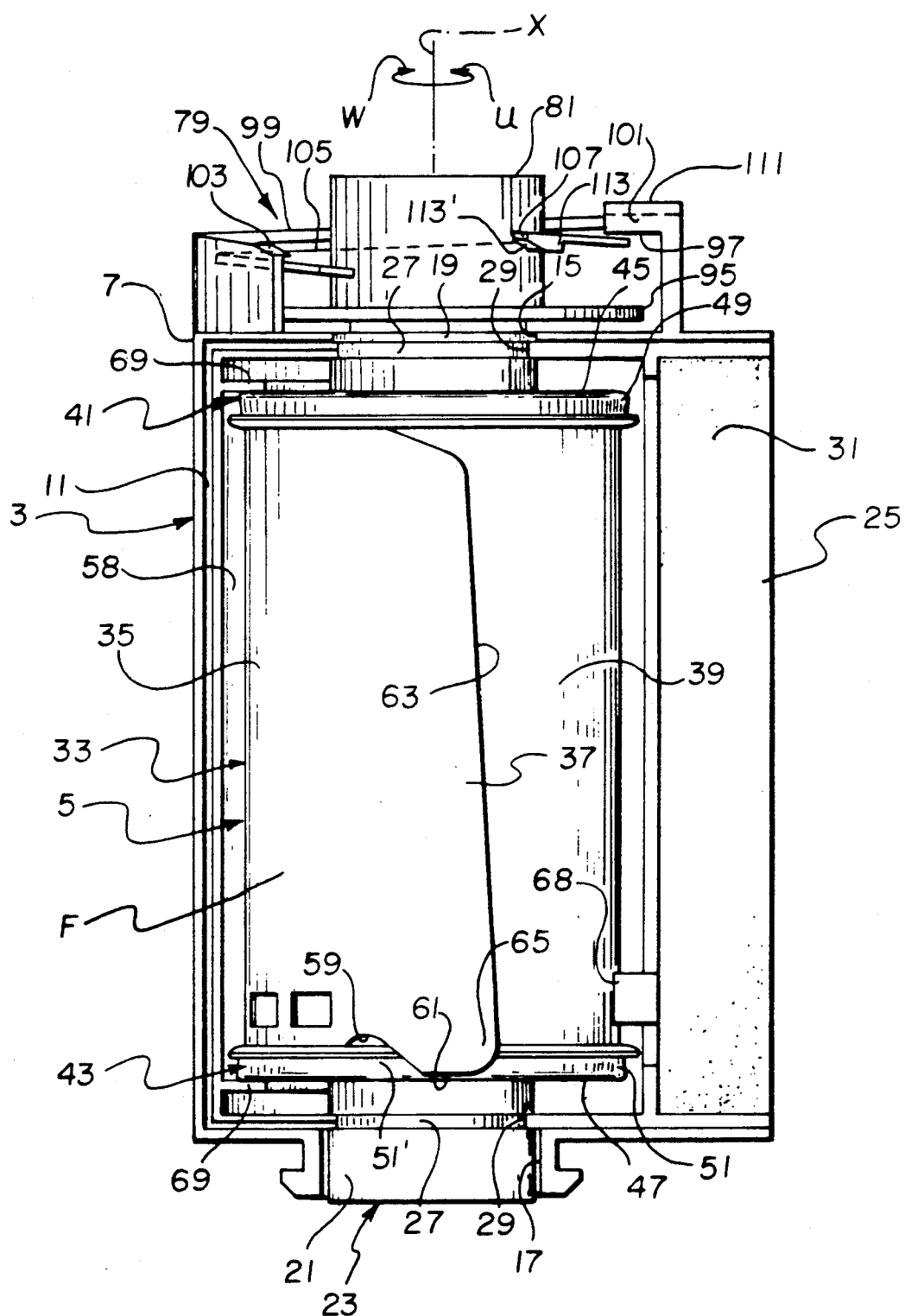
FIG. 2 is an elevation view of the film cassette, illustrating the cassette shell open to reveal a film roll coiled about a film spool.
Figure 12:
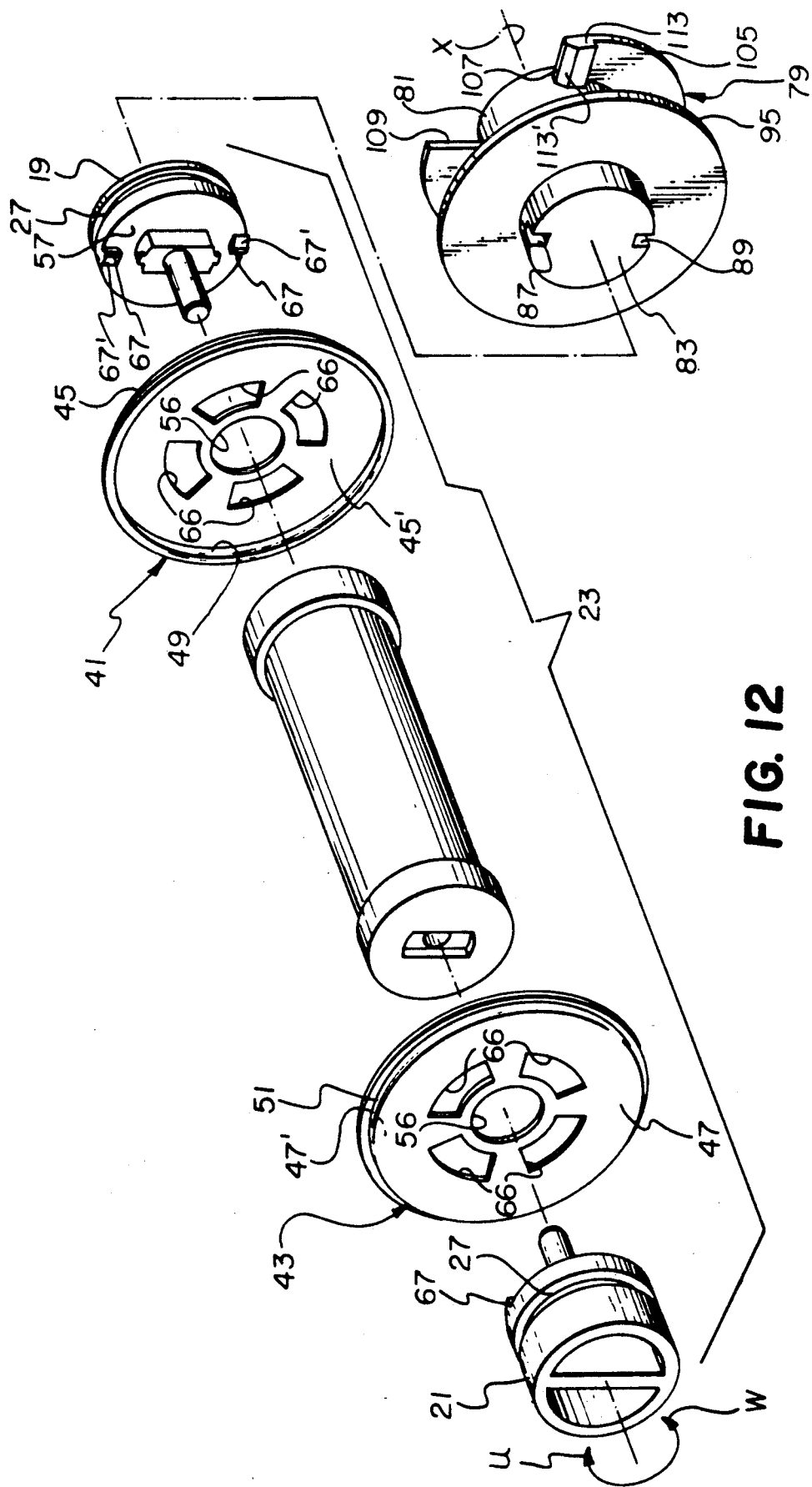
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The shorter and longer open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
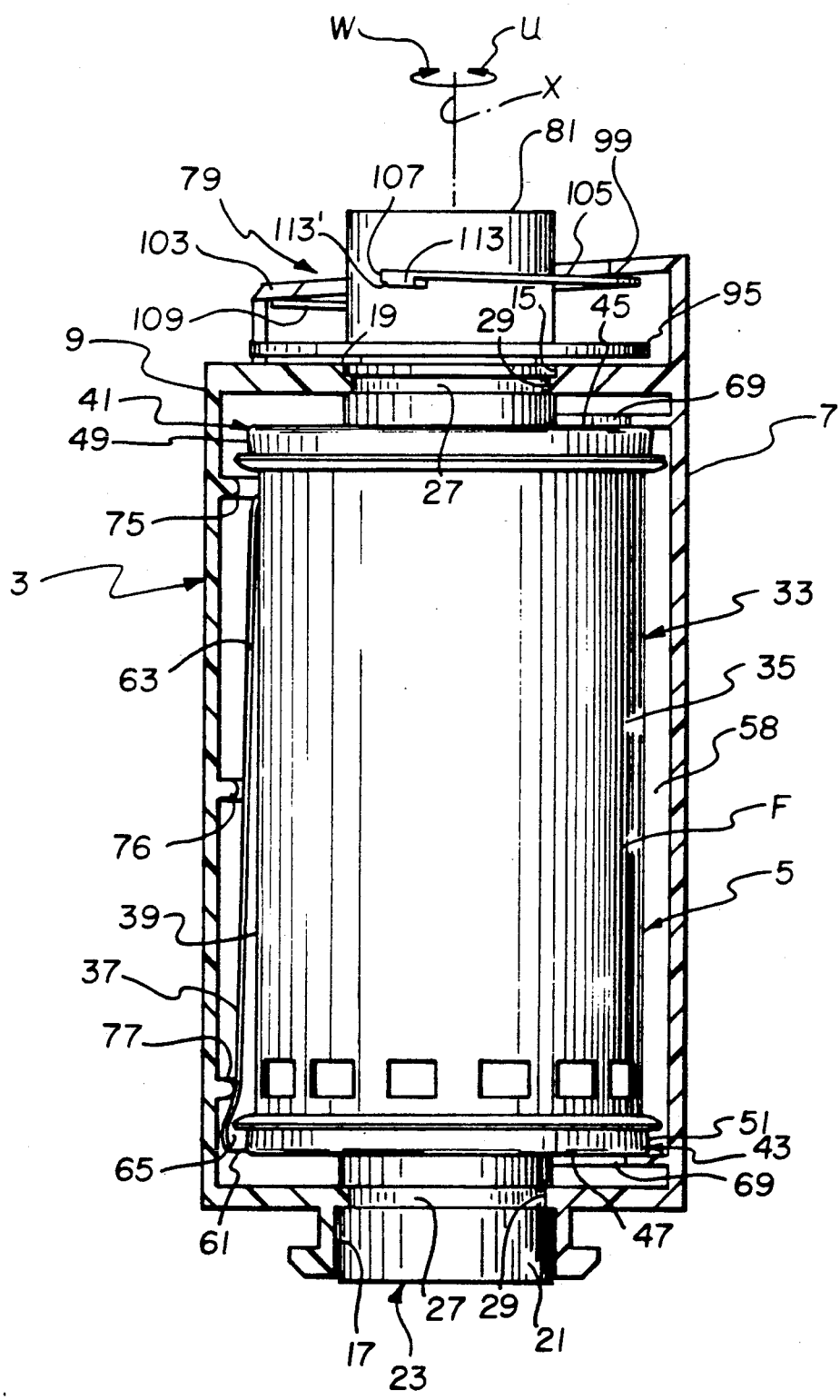
FIG. 3 is an elevation view similar to FIG. 2, through in section.
Figure 13:
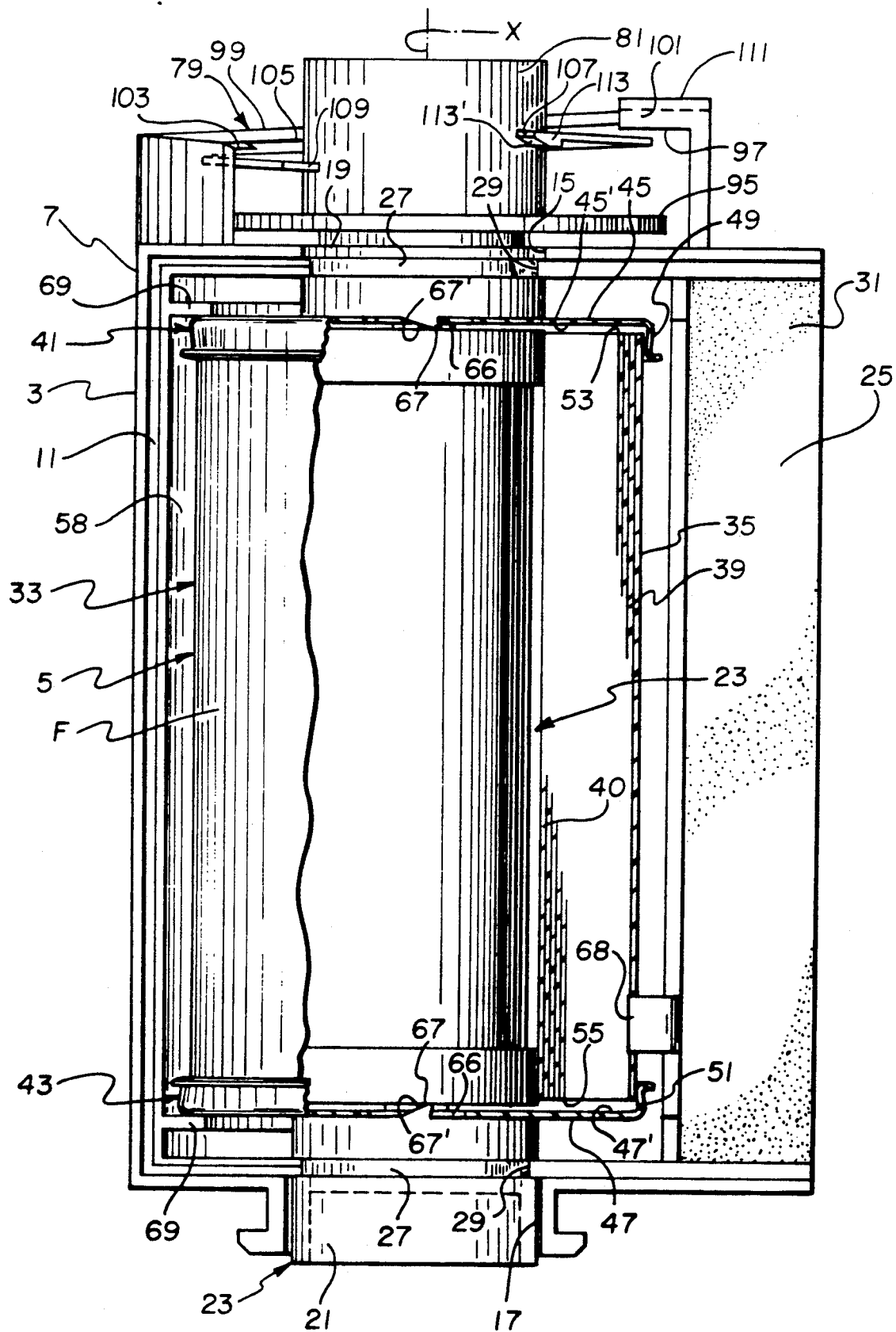
FIG. 13 is an elevation view partly in section of the film roll and the film spool, illustrating the manner in which one of a pair of film confining flanges of the spool may be fixed to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential gaps or recesses 57 are provided in the spool core 23 for supporting the flanges 41 and 43 at their disks 45 and 47 to permit the flanges to be independently rotated about the axis X. The two gaps 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
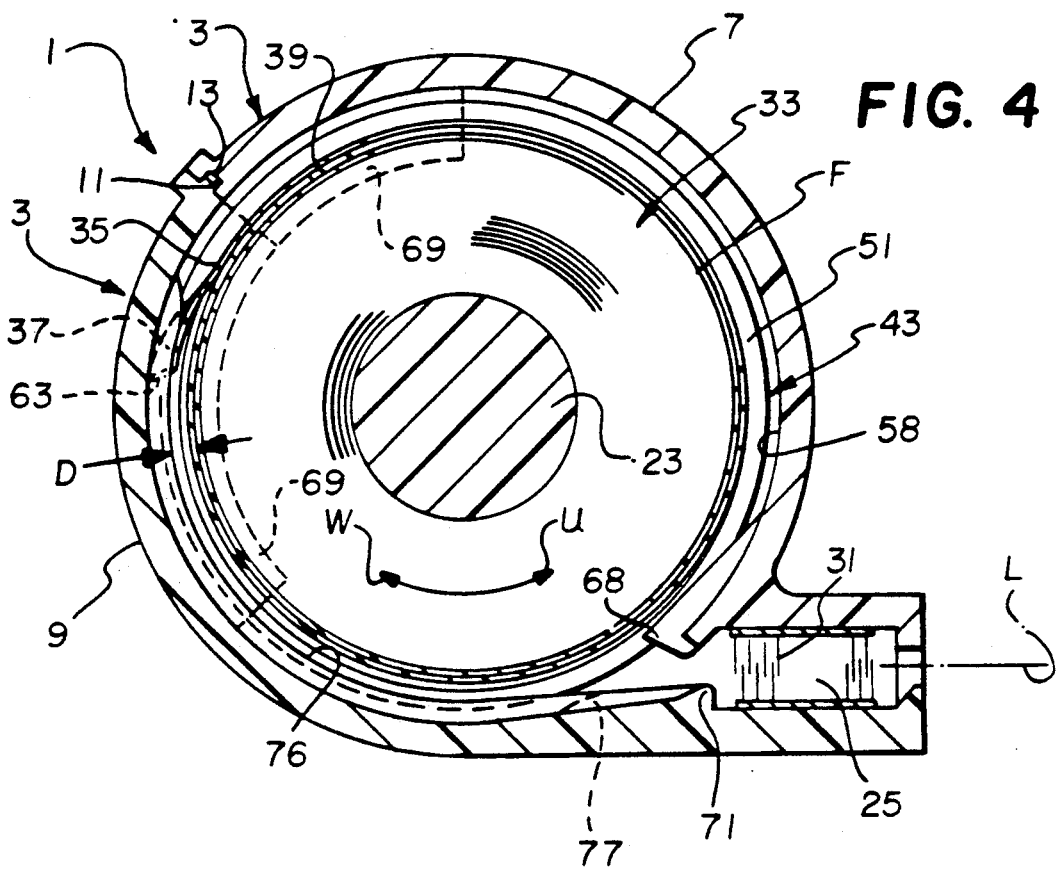
FIG. 4 is an end view partly in section of the cassette shell, the film roll and the film spool, illustrating the manner in which the film roll is originally stored on the film spool.
Figure 5:
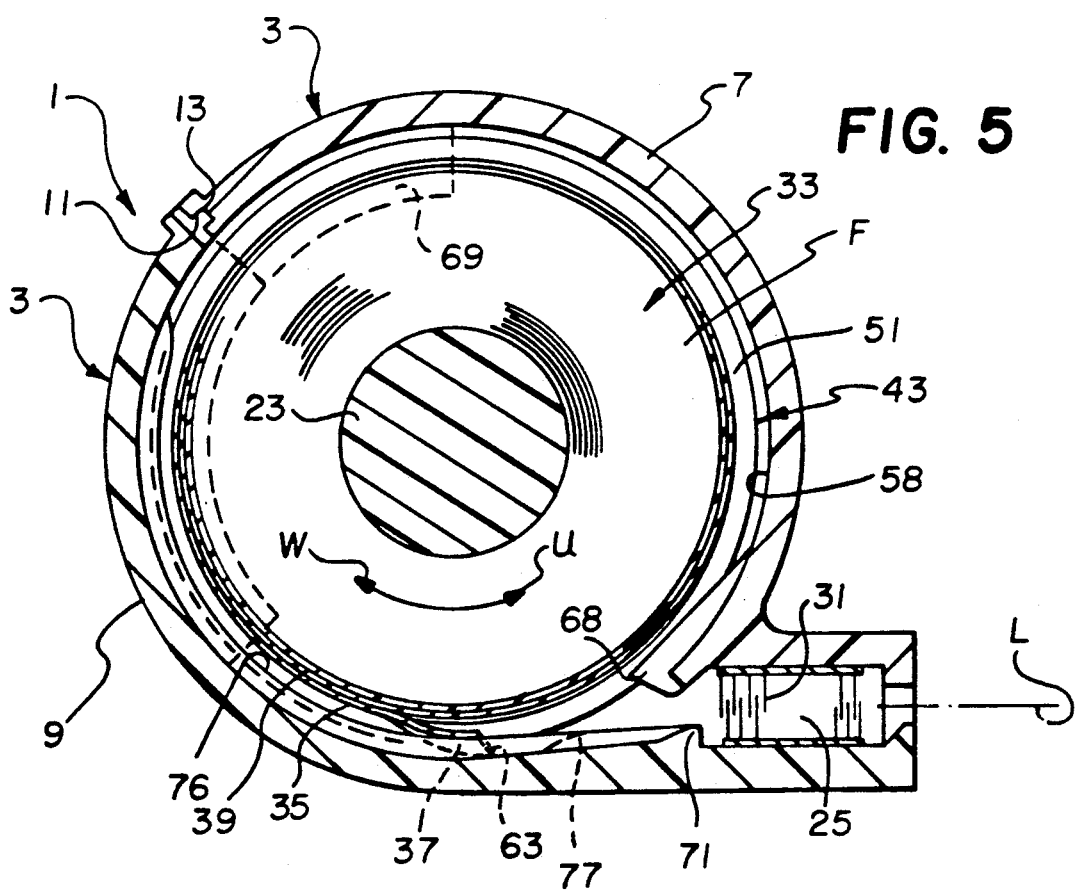
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
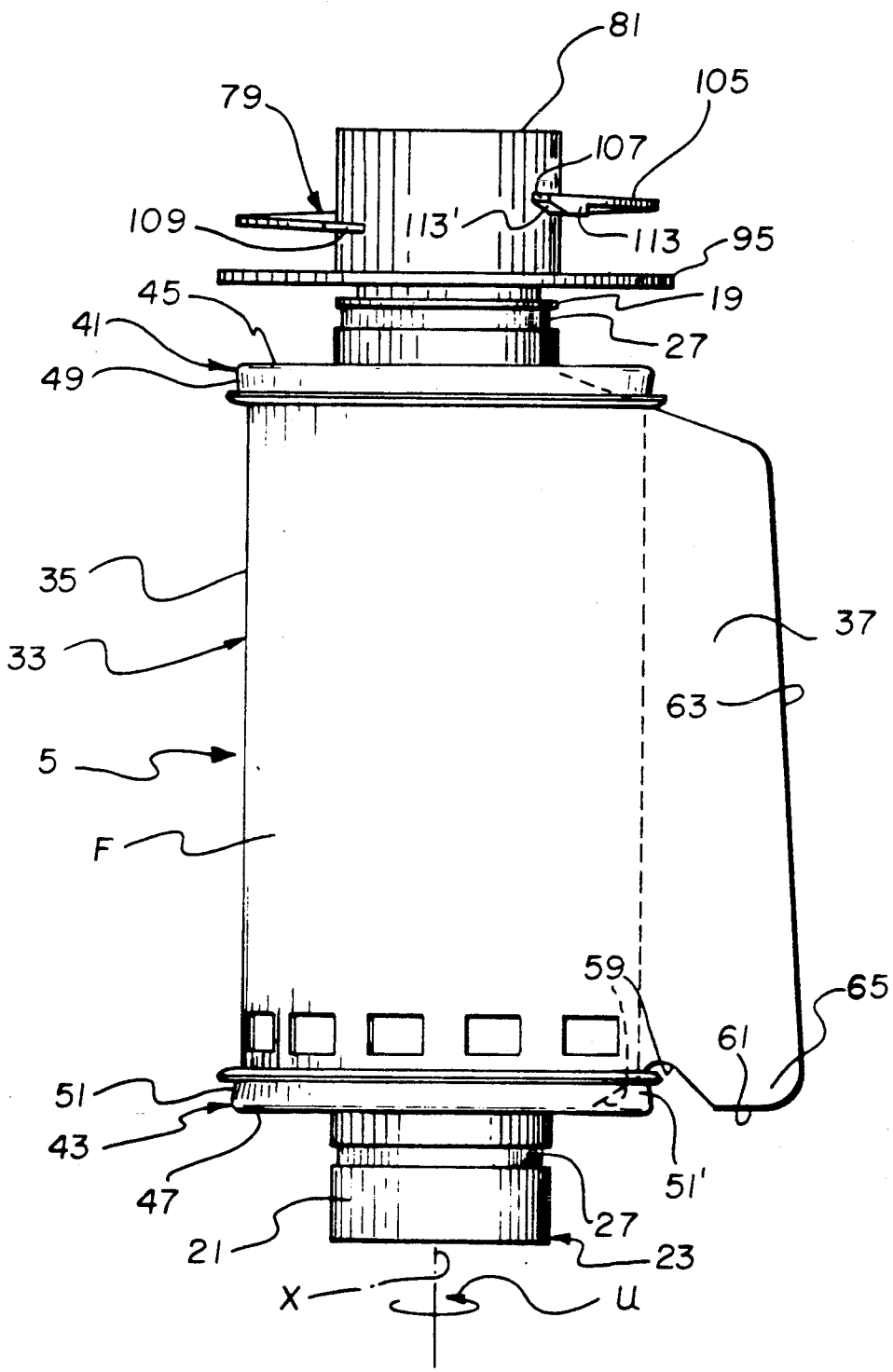
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"-0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75-77 longitudinally extend perpendicular to and adjoin the flattening rib 71. See FIG. 1.

SPOOL LOCK

A spool lock 79 is shown in FIGS. 1-3 and 113-16. The spool lock 79 includes a hub 81 having a depending portion 83 that is located within a central opening 85 in the shorter open-end piece 19 of the spool core 23. See FIGS. 1 and 12. The depending portion 83 has opposite slots 87 and 89 that receive respective projections 91 and 93 of the shorter open-end piece 19 to cause the hub 81 to rotate in the unwinding and winding directions U and W coaxially with the spool core 23 and to permit translation of the hub along the axis X towards and away from the spool core. A rigid annular collar 95 of the hub 81 is positioned to abut the underside 97 of a rigid arcuate ramp 99, integrally formed with the shell half 7, to limit translation of the hub 81 away from the spool core 23.

Figure 14:
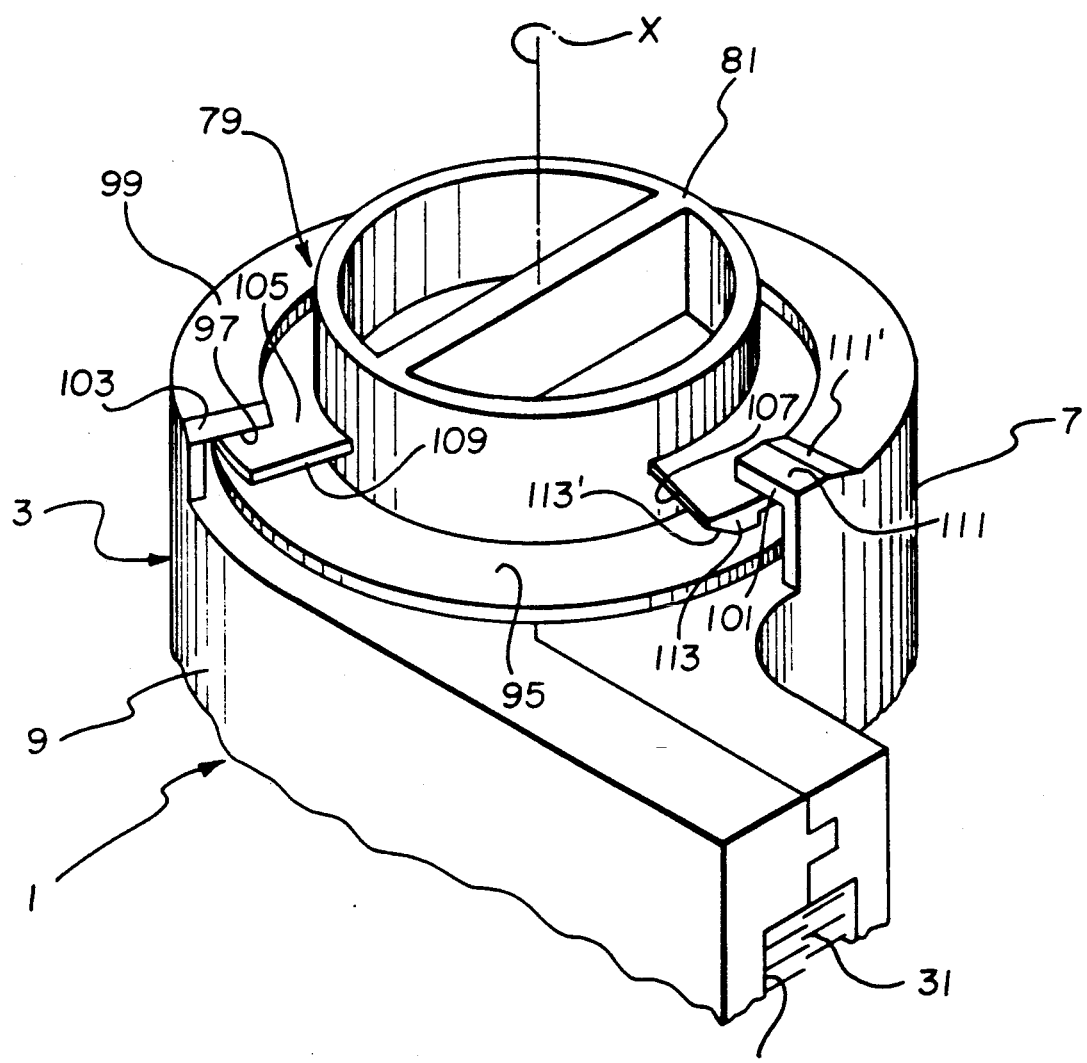
FIGS. 14, 15 and 16 are partial perspective views of the film cassette, illustrating operation of the spool lock.

As shown in FIGS. 1, 2 and 14, the rigid arcuate ramp 99 has a higher end 101 and a lower end 103. A flexible arcuate ramp 105, fixed to the hub 81, is located normally beneath the underside 97 of the rigid arcuate ramp 99, and it has a higher end 107 and a lower end 109. The lower end 109 of the flexible arcuate ramp 105 is lower than the higher and lower ends 101 and 103 of the rigid arcuate ramp 99. The higher end 107 of the flexible ramp 105 is higher than the lower end 103 of the rigid ramp 99 and lower than the higher end 101 of the rigid ramp, and it is held beneath the lower end by the underside 97 of the rigid ramp. See FIGS. 2 and 14.

An engageable member 111 is integrally formed with the rigid ramp 99 at the higher end 101 of the rigid ramp. Likewise, an engageable member 113 is integrally formed with the flexible ramp 105 at the higher end 107 of the flexible ramp. See FIG. 14.

When the spool core 23 is rotated in the unwinding direction U, the lower end 109 of the flexible ramp 105 is a leading end which periodically will pass under the higher end 101 of the rigid ramp 99, and the higher end 107 of the flexible ramp is a trailing end which will be flexed by the underside 97 of the rigid ramp to periodically pass under the lower end 103 of the rigid ramp. Thus, the engageable members 111 and 13 will be kept then in a disabled condition in which they are located out of reach of one another to prevent their engagement. See FIGS. 2 and 14.

Figure 15:
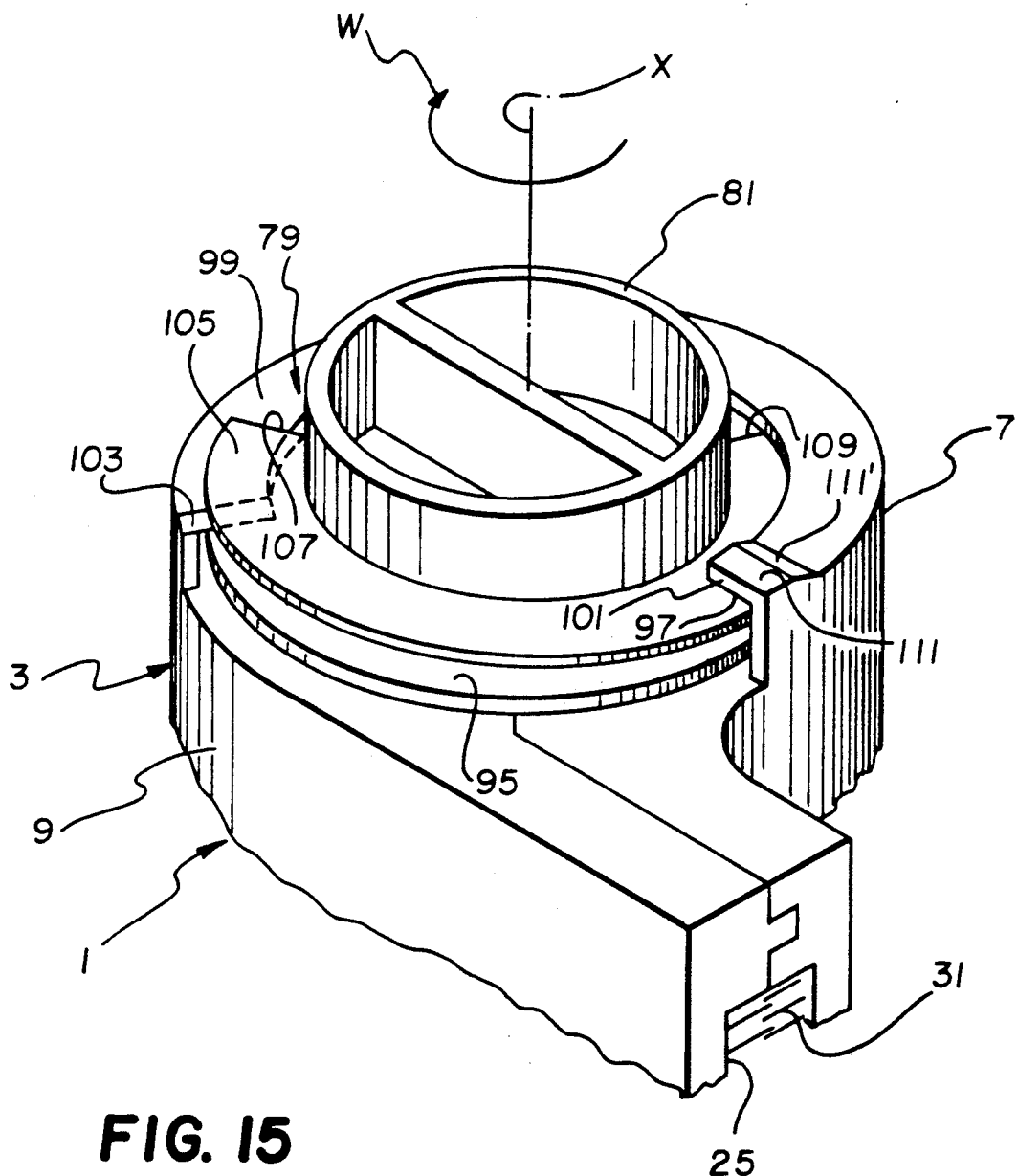

If the spool core 23 is rotated in the winding direction W, the higher end 107 of the flexible ramp 105 is a leading end which will be rotated over, i.e. atop, the lower end 103 of the rigid ramp 99 as shown in FIG. 15. This causes the hub 81 to be cammed by the rigid ramp 99 axially away from the spool core 23 until the rigid collar 95 of the hub abuts the underside 99 of the rigid ramp. During continued rotation of the spool core 23 in the winding direction W, the engageable member 113 of the flexible ramp 105 periodically passes over, i.e. atop, the engageable member 111 of the rigid ramp 99. The two engageable members 111 and 113, although now in an enabled condition in which they are located within reach of one another to permit their engagement, are prevented from engaging because of their respective beveled edges 111' and 113'.

Figure 16:
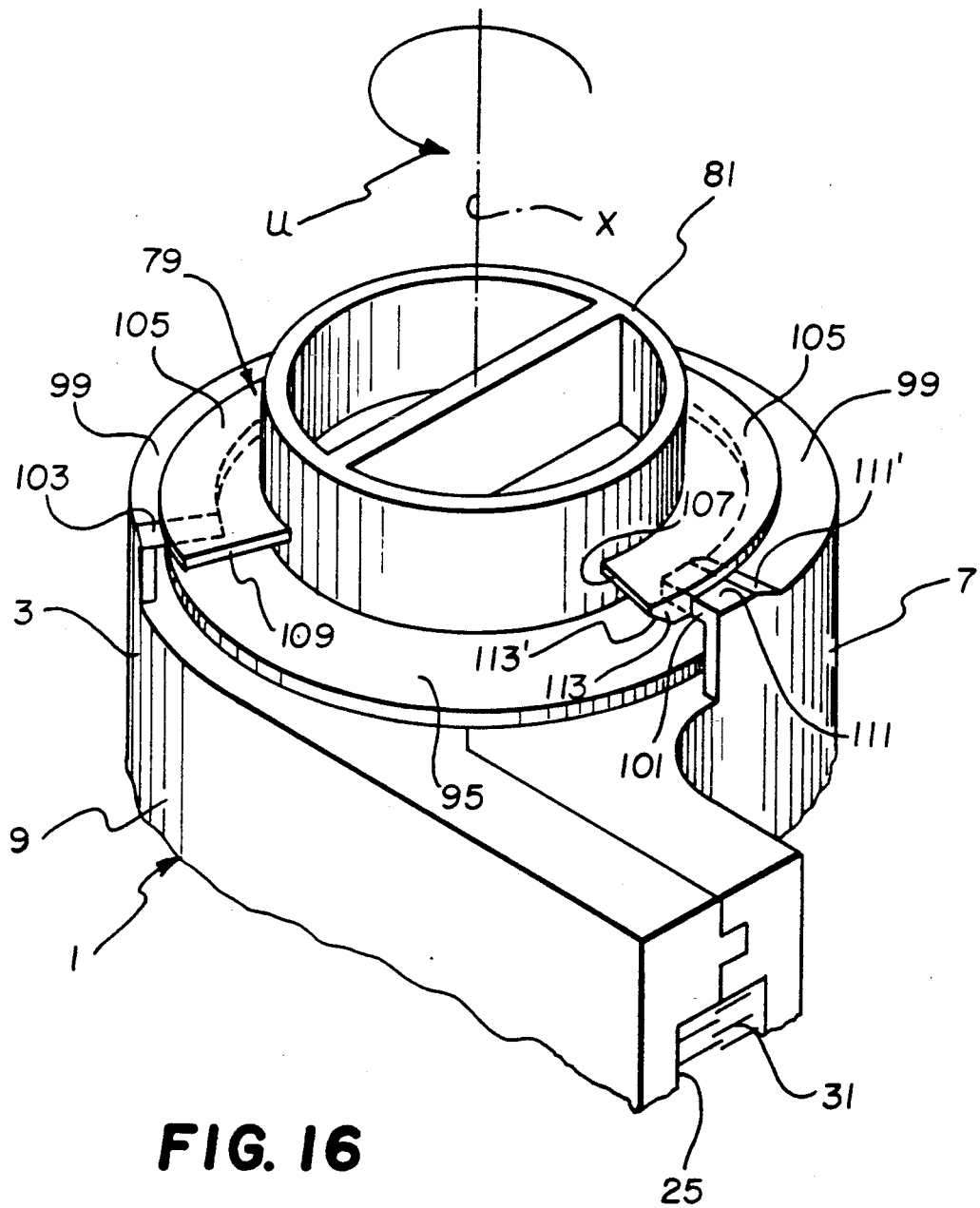

Should the spool core 23 be rotated in the unwinding direction U, after it has been rotated sufficiently in the winding direction W to pass the engageable member 113 of the flexible ramp 105 over the engageable member 111 of the rigid ramp 99, the two engageable members will engage as shown in FIG. 16. Thus, the spool core 23 will be locked to prevent further rotation of the spool core in the unwinding direction U. However, the spool lock can be manually defeated first by lifting the engageable member 113 of the flexible ramp 105 away from the engageable member 111 of the rigid ramp 99 and then rotating the spool core 23 in the unwinding directions U. Rotation of the spool core 23 in the unwinding direction U then causes the lower end 109 of the flexible ramp 105 to be moved below the higher end 107 of the rigid ramp 99. Thus, the hub 81 will be cammed by the rigid ramp 99 axially towards the spool core 23, returning the flexible ramp 105 beneath the underside 97 of the rigid ramp and returning the engageable members 111 and 113 to their disabled condition. See FIGS. 2 and 14.

OPERATION

Figure 6:
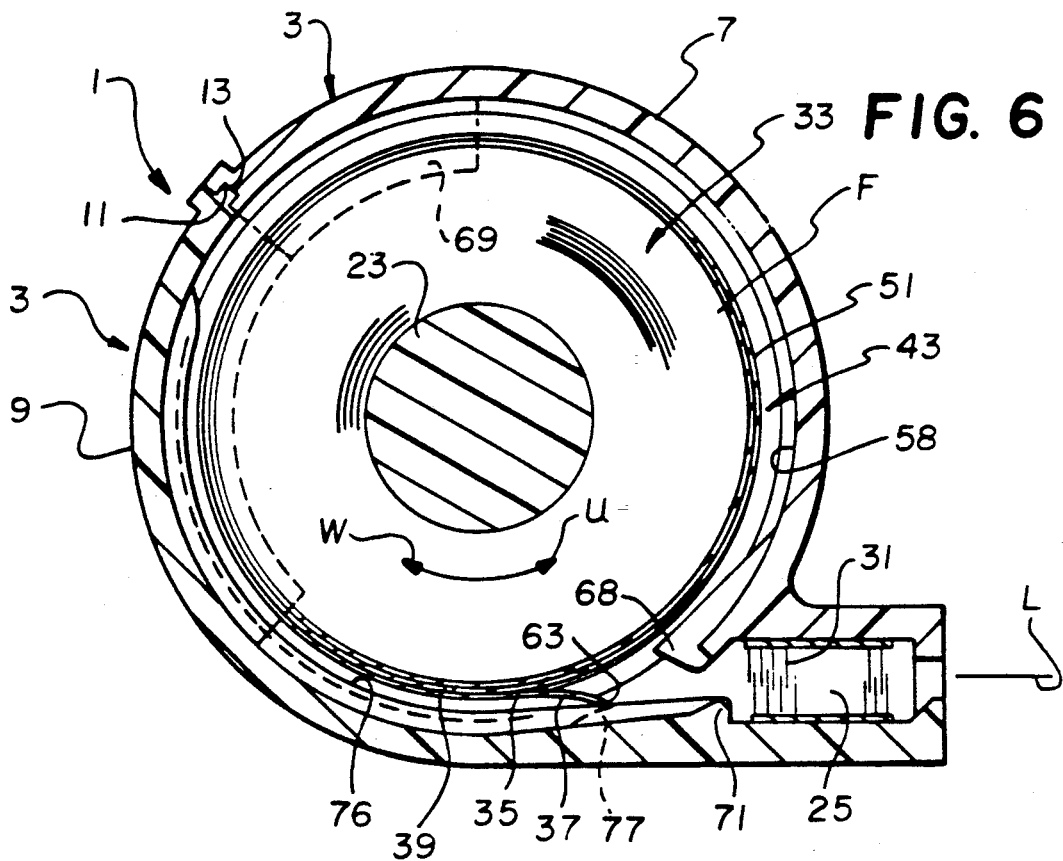
Figure 7:
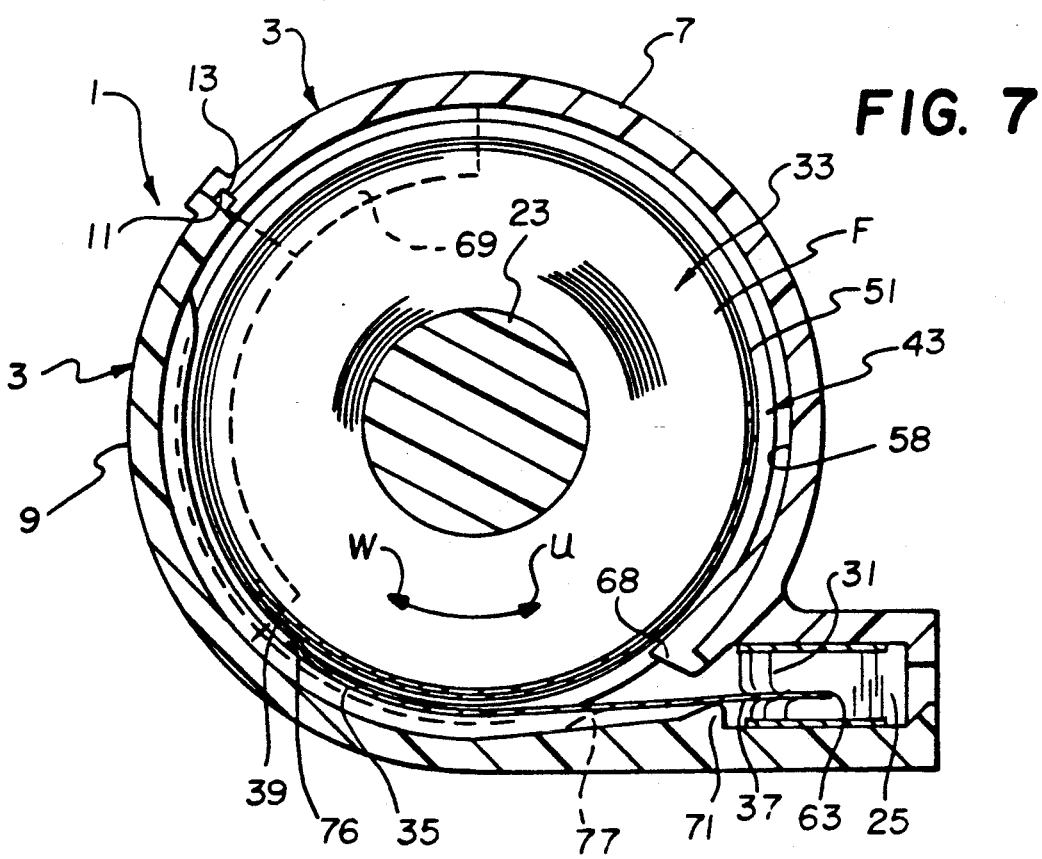
Figure 11:
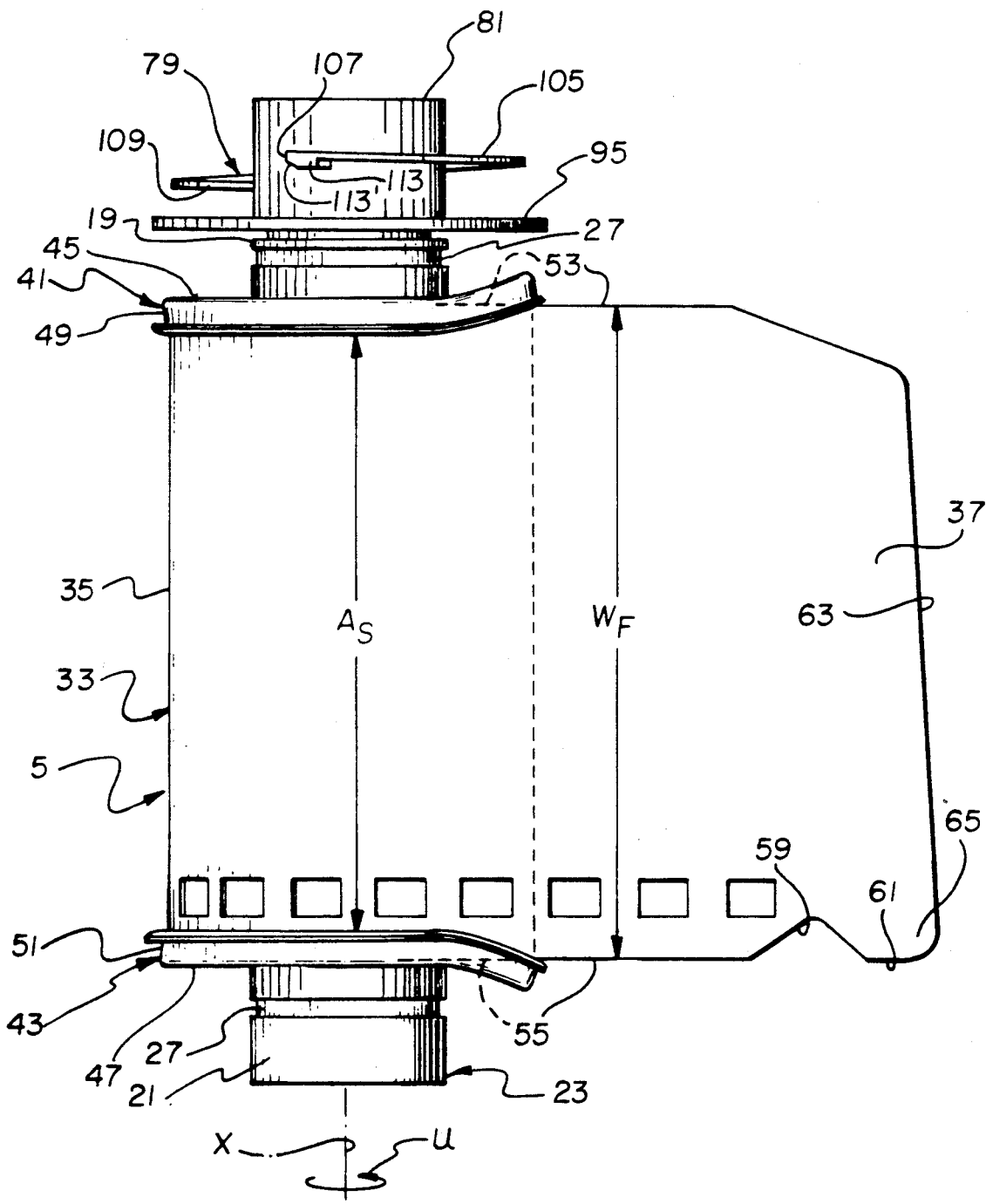

When the spool core 23 is initially rotated in the unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 might uncoil against the interior wall 58 of the shell half. As a result, increased torque would be required to rotate the spool core 23 in the unwinding direction U. However, the two ribs 75 and 76 serve to severely limit the extent to which the leader 35 can uncoil from between the flanges 41 and 43.

If the spool core 23 is rotated in the winding direction W after some length of the filmstrip F has been advanced from the cassette shell 3, the engageable members 111 and 113 will be placed in their enabled condition, but will not engage. See FIG. 15. Moreover, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

Should the spool core 23 be rotated in the unwinding direction U, after it has been rotated in the winding direction W to return the filmstrip F to the cassette shell 3, the engageable members 111 and 113 will engage as shown in FIG. 16. Thus, the spool core 23 will be locked to prevent further rotation of the spool core in the unwinding direction U.

The invention has been described with reference to a preferred embodiment. However, it will be appreciated that variations and modifications can be effected within the ordinary skill in the art without departing from the scope of the invention.

I claim:

1. An improved film cassette wherein a film spool is supported within a lighttight shell for rotation in an unwinding direction to thrust a filmstrip coiled about said spool to the exterior of said shell and for rotation in a winding direction to return said filmstrip to the interior of the shell, and wherein the improvement comprises:
   a pair of engageable means for engaging one another when said spool is rotated in the unwinding direction to prevent rotation of the spool in that direction; and
   actuation means for arranging said pair of engageable means normally in a disabled condition in which the engageable means are located out of reach of one another to prevent their engagement when the spool is rotated in the unwinding direction and for changing the engageable means responsive to rotation of the spool in the winding direction to an enabled condition in which the engageable means are located within reach of one another to permit their engagement when the spool is rotated in the unwinding direction.

2. The improvement as recited in claim 1, wherein said actuation means includes integral means for disengaging said pair of engageable means manually from one another to allow said spool to be rotated in the unwinding direction.

3. An improved film cassette wherein a film spool is supported within a lighttight shell for rotation in an unwinding direction to thrust a filmstrip coiled about said spool to the exterior of said shell and for rotation in a winding direction to return said filmstrip to the interior of the shell, and wherein the improvement comprises:
   locking means connected to said spool and said shell for preventing rotation of the spool in the unwinding direction only after the spool is rotated in the winding direction.

4. The improvement as recited in claim 3, wherein said locking means includes a pair of engageable means for engaging one another when said spool is rotated in the unwinding direction to prevent rotation of the spool in that direction and cam means responsive to rotation of the spool in the winding direction for positioning the engageable means to engage one another when the spool is rotated in the unwinding direction.

5. An improved film cassette wherein a film spool is supported within a lighttight shell for rotation in an unwinding direction to thrust a filmstrip coiled about said spool to the exterior of said shell and for rotation in a winding direction to return said filmstrip to the interior of the shell, and wherein the improvement comprises:

respective engageable means connected to said spool and said shell to permit said engageable means to be relatively positioned for engaging one another when the spool is rotated in the unwinding direction to prevent rotation of the spool in that direction; and respective enabling means connected to said spool and said shell for relatively positioning said engageable means responsive to rotation of the spool in the winding direction to engage one another when the spool is rotated in the unwinding direction.

6. The improvement as recited in claim 5, wherein said enabling means includes integral means for disengaging said engageable means manually from one another to allow said spool to be rotated in the unwinding direction.

7. An improved film cassette wherein a film spool is supported within a lighttight shell for rotation in an unwinding direction to thrust a filmstrip coiled about said spool to the exterior of said shell and for rotation in a winding direction to return said filmstrip to the interior of the shell, and wherein the improvement comprises:

normally non-engaging locking means for engaging only when said spool is rotated in the unwinding direction to prevent rotation of the spool in that direction, and being enabled for such purpose in response to rotation of the spool in the winding direction.

8. An improved film cassette wherein a film spool is supported within a lighttight shell for rotation in an unwinding direction to thrust a filmstrip coiled about said spool to the exterior of said shell and for rotation in a winding direction to return said filmstrip to the interior of the shell, and wherein the improvement comprises:

locking means for preventing rotation of said spool in the unwinding direction and enabled for such purpose in response to rotation of the spool in the winding direction, to prevent reuse of said cassette after said filmstrip is returned to the interior of said shell.

* * * * *